(12) United States Patent
Dominick et al.

(10) Patent No.: US 7,742,432 B2
(45) Date of Patent: Jun. 22, 2010

(54) TOPOLOGY COMPARISON

(75) Inventors: Scott M. Dominick, Cary, NC (US);
Paul F. McMahan, Apex, NC (US)

(73) Assignee: International Busniness Machines Corporation, Armonk, NY (US)

( * ) Notice: Subject to any disclaimer, the term of this patent is extended or adjusted under 35 U.S.C. 154(b) by 752 days.

(21) Appl. No.: 11/325,943

(22) Filed: Jan. 5, 2006

(65) Prior Publication Data

US 2007/0153708 A1 Jul. 5, 2007

(51) Int. Cl.
*H04L 12/28* (2006.01)
(52) U.S. Cl. .................... 370/254; 709/220; 709/223; 709/224
(58) Field of Classification Search ................. 370/254, 370/255, 225, 235, 355; 709/224, 223; 715/733, 715/734, 853; 711/153
See application file for complete search history.

(56) References Cited

U.S. PATENT DOCUMENTS

| | | | | |
|---|---|---|---|---|
| 5,933,416 | A * | 8/1999 | Schenkel et al. | ............ 370/254 |
| 5,974,254 | A | 10/1999 | Hsu | |
| 6,262,976 | B1 * | 7/2001 | McNamara | ................. 370/254 |
| 6,278,452 | B1 | 8/2001 | Huberman et al. | |
| 7,245,589 | B2 * | 7/2007 | Neulist et al. | ................ 370/254 |
| 7,523,187 | B1 * | 4/2009 | Lavallee et al. | ............. 709/223 |
| 2003/0009552 | A1 * | 1/2003 | Benfield et al. | ............. 709/224 |
| 2003/0069960 | A1 * | 4/2003 | Symons et al. | ............... 709/224 |
| 2004/0150644 | A1 | 8/2004 | Kincaid et al. | |
| 2004/0210654 | A1 | 10/2004 | Hrastar | |
| 2005/0120030 | A1 | 6/2005 | Varpela et al. | |
| 2005/0198216 | A1 * | 9/2005 | Behera et al. | ................ 709/220 |
| 2006/0106999 | A1 * | 5/2006 | Baldwin et al. | ............. 711/153 |
| 2006/0236267 | A1 * | 10/2006 | Gierschik et al. | ........... 715/853 |

* cited by examiner

*Primary Examiner*—Dang T Ton
*Assistant Examiner*—Mohamed Kamara
(74) *Attorney, Agent, or Firm*—Robert Straight; Law Office of Jim Boice

(57) ABSTRACT

A solution for comparing topologies is provided. In an embodiment of the invention, a set of differences between the nodes and/or connectors of two or more topologies is obtained. Each difference can comprise a missing node/connector and/or a difference in an item/relationship attribute. A user interface is generated that displays one or more of the differences by displaying a subset of each topology that corresponds to the difference. In an embodiment of the invention, a user interface for comparing topologies is provided that displays each subset in a unique display area and enables a user to select the difference(s) and/or limit the difference(s) that can be selected based on the type of difference.

19 Claims, 5 Drawing Sheets

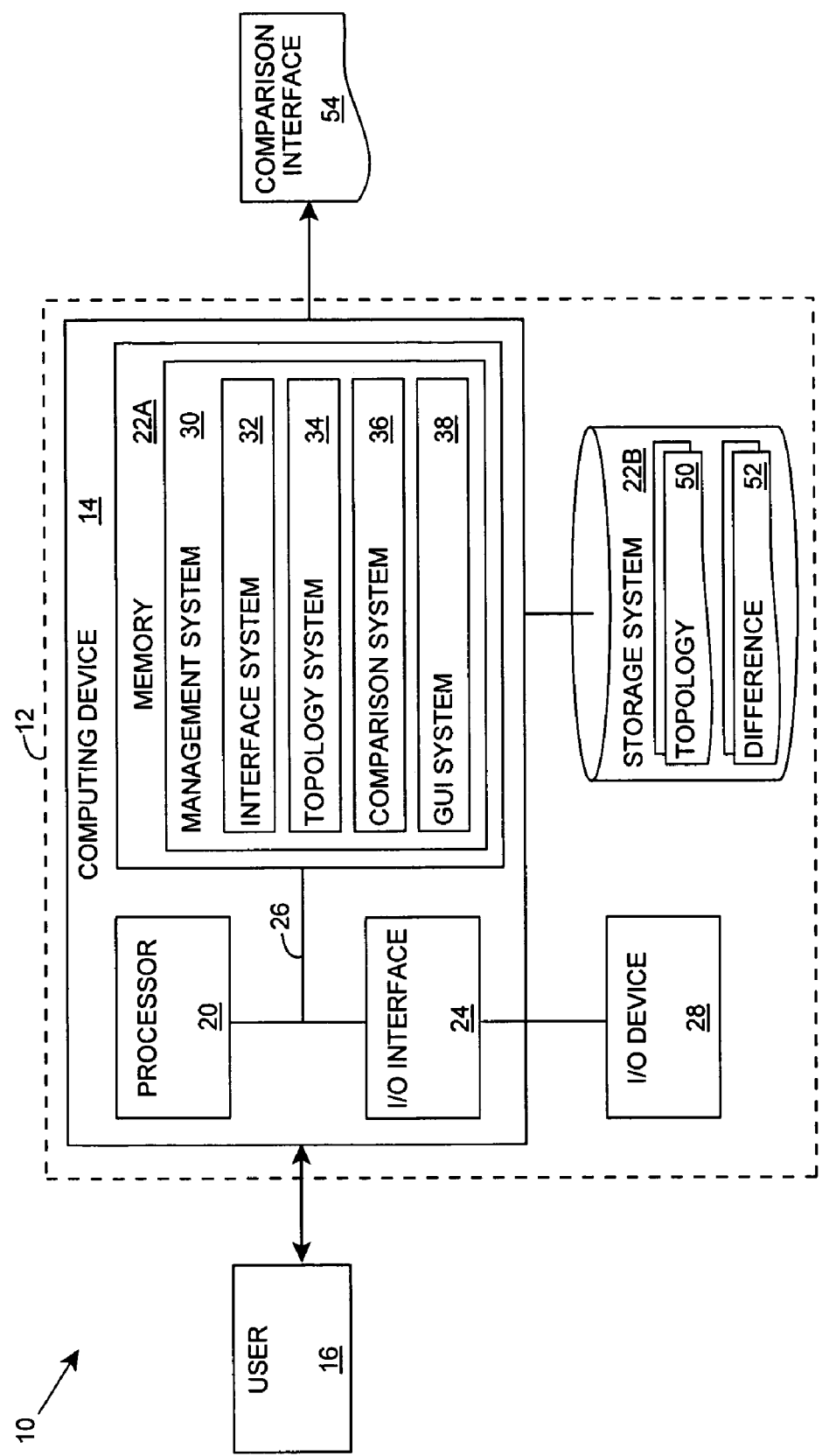

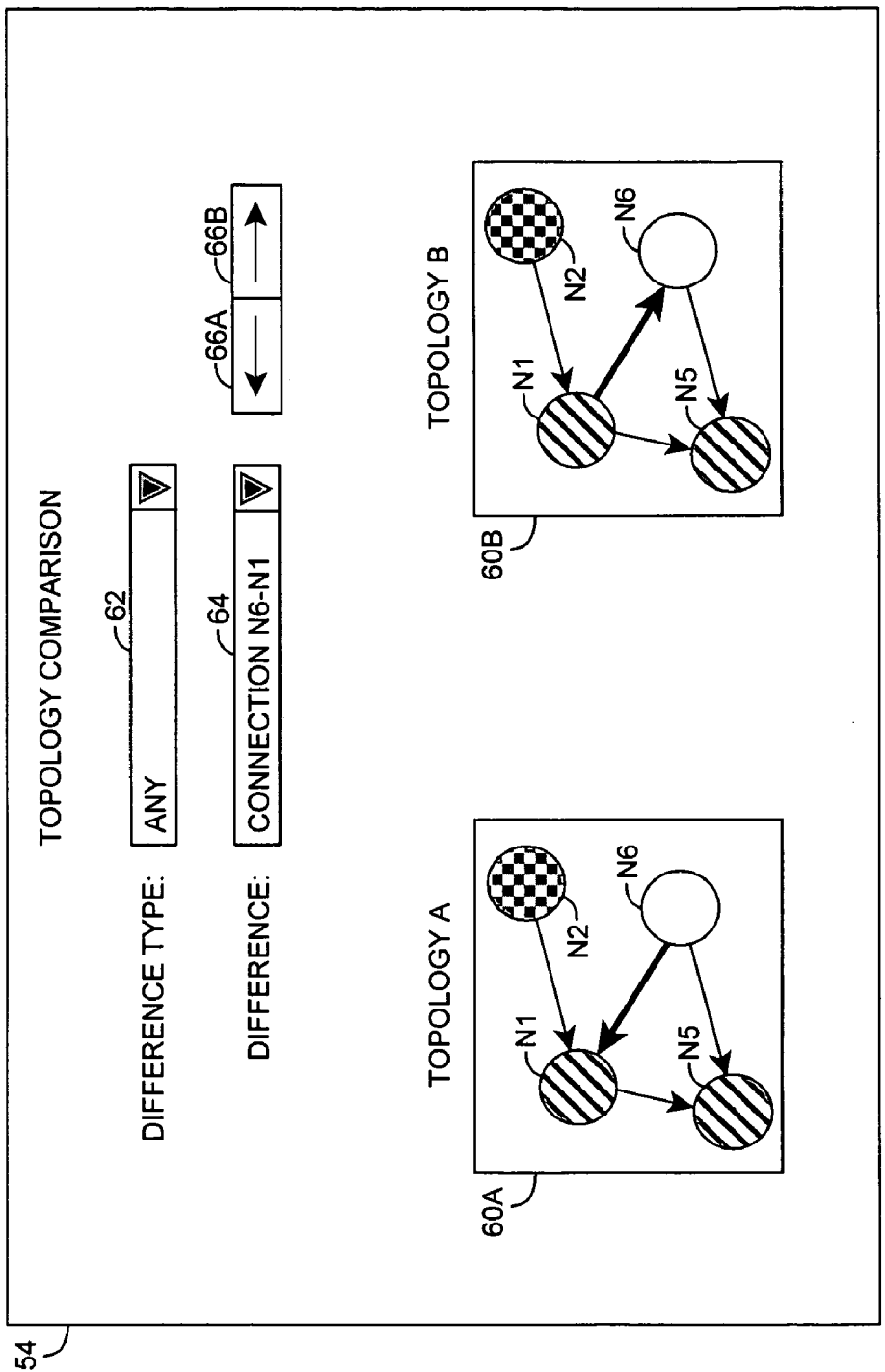

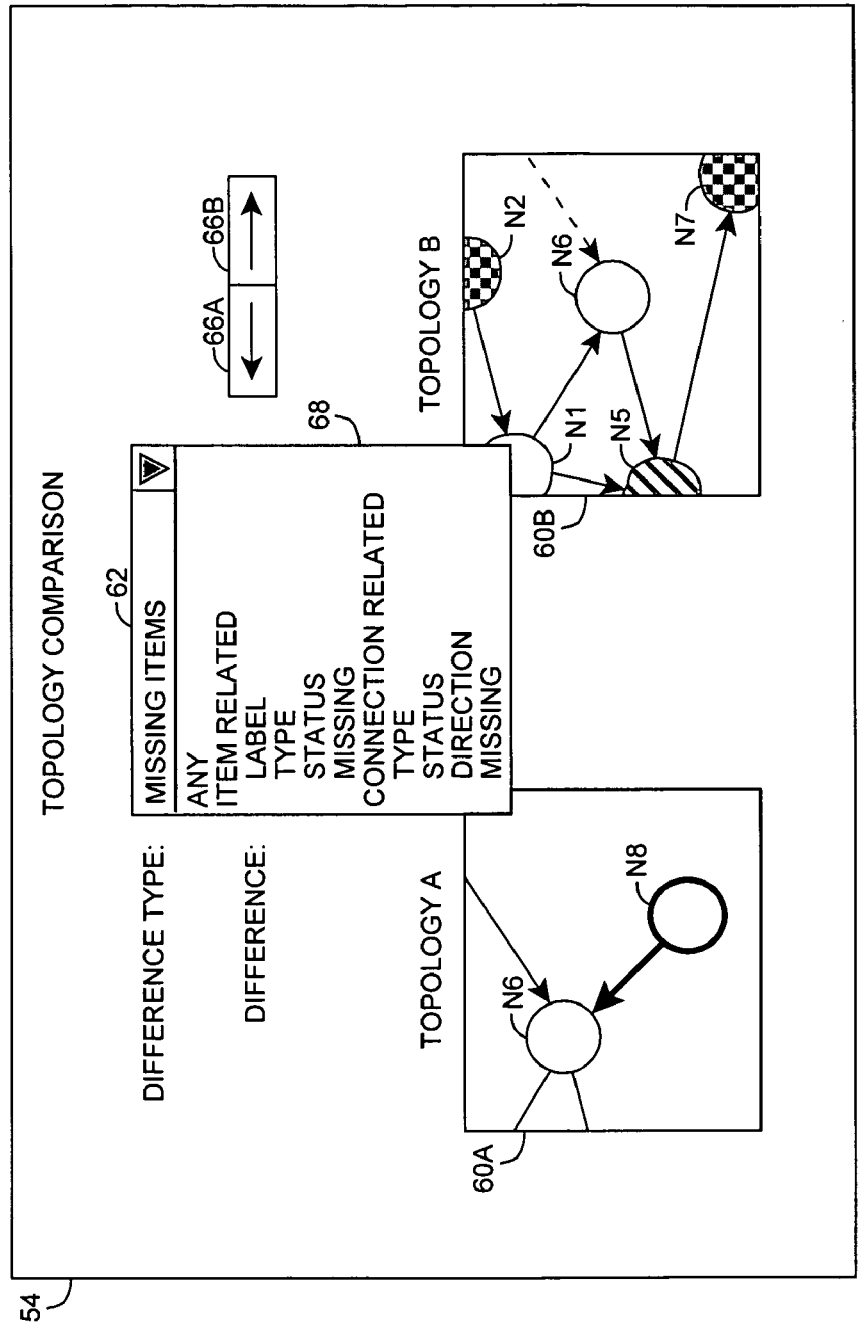

TOPOLOGY COMPARISON

FIELD OF THE INVENTION

The invention relates generally to comparing topologies, and more particularly, to a solution for displaying differences between two or more topologies.

BACKGROUND OF THE INVENTION

A topology can include many nodes and many connectors that define various relationships between the nodes. A problem with using a topology is that the number of nodes and connectors can increase rapidly. To this extent, displaying a topology may be a problem when the topology includes too many nodes and connectors than what is capable of being displayed in a user interface. One solution reduces the topology so that it can be displayed in its entirety within the user interface. However, for larger topologies, this solution can result in a very small rendering of the nodes/connectors, making their selection and/or viewing difficult. Another solution renders the nodes/connectors at an acceptable size, while enabling the user to scroll to different areas of the topology. However, since only a limited portion of the topology may be visible, the user may lose the ability to readily gain an understanding of the context of the displayed portion.

Frequently, a user desires to compare two or more topologies. In particular, the user may desire to identify any nodes/connectors that are different and/or missing between two topologies. To assist in the comparison, one solution displays the topologies side by side. However, this solution requires the user to visually scan both topologies in their entirety and mentally determine any differences. This process is both time consuming and error prone. For example, the user may inadvertently overlook a difference between the topologies. Further, one or more aspects of the topologies can make the determination difficult. For example, the topologies may render corresponding nodes in different locations. Another solution superimposes the two topologies on one another. Various fonts, adornments, and/or saturations can be used to assist the user in distinguishing differences between the topologies. However, this solution remains time consuming and subject to the user overlooking one or more differences.

The illustrative aspects of the present invention are designed to solve the problems herein described and/or other problems not discussed.

SUMMARY OF THE INVENTION

The invention provides a solution for comparing topologies. In an embodiment of the invention, a set of differences between the nodes and/or connectors of two or more topologies is obtained. Each difference can comprise a missing node/connector and/or a difference in an item/relationship attribute. A user interface is generated that displays one or more of the differences by displaying a subset of each topology that corresponds to the difference. In an embodiment of the invention, a user interface for comparing topologies is provided that displays each subset in a unique display area and enables a user to select the difference(s) and/or limit the difference(s) that can be selected based on the type of difference.

A first aspect of the invention provides a computerized method of comparing topologies, the method comprising: obtaining a first topology and a second topology, each topology including a set of nodes, each node representing an item having a set of item attributes; obtaining a set of differences between the first topology and the second topology based on the set of item attributes; and generating a user interface that displays at least one of the set of differences, the user interface displaying a first subset of the first topology and a second subset of the second topology, the first and second subsets corresponding to the at least one of the set of differences.

A second aspect of the invention provides a system for comparing topologies, the system comprising: a system for obtaining a first topology and a second topology, each topology including: a set of nodes, each node representing an item having a set of item attributes; and a set of connectors, each connector representing a relationship having a set of relationship attributes; a system for obtaining a set of differences between the first topology and the second topology based on at least one of: the set of item attributes or the set of relationship attributes; and a system for generating a user interface that displays at least one of the set of differences, the user interface displaying a first subset of the first topology and a second subset of the second topology, the first and second subsets corresponding to the at least one of the set of differences.

A third aspect of the invention provides a program product stored on a computer-readable medium, which when executed, enables a computer infrastructure to compare topologies, the program product comprising computer program code for enabling the computer infrastructure to: obtain a first topology and a second topology, each topology including: a set of nodes, each node representing an item having a set of item attributes; and a set of connectors, each connector representing a relationship having a set of relationship attributes; obtain a set of differences between the first topology and the second topology based on at least one of: the set of item attributes or the set of relationship attributes; and generate a user interface that displays at least one of the set of differences, the user interface displaying a first subset of the first topology and a second subset of the second topology, the first and second subsets corresponding to the at least one of the set of differences.

A fourth aspect of the invention provides a method of generating a system for comparing topologies, the method comprising: providing a computer infrastructure operable to: obtain a first topology and a second topology, each topology including: a set of nodes, each node representing an item having a set of item attributes; and a set of connectors, each connector representing a relationship having a set of relationship attributes; obtain a set of differences between the first topology and the second topology based on at least one of: the set of item attributes or the set of relationship attributes; and generate a user interface that displays one of the set of differences, the user interface displaying a first subset of the first topology and a second subset of the second topology, the first and second subsets corresponding to the at least one of the set of differences.

A fifth aspect of the invention provides a user interface for comparing topologies, the user interface comprising: a first display area for displaying a first subset of a first topology; a second display area for displaying a second subset of a second topology, the first and second subsets corresponding to at least one of a set of differences between the first topology and the second topology; a first user interface control that enables a user to select the at least one of the set of differences; and a second user interface control that enables a user to select a subset of the set of differences for selection using the first user interface control based on one of the set of item attributes or the set of relationship attributes that corresponds to the difference.

A sixth aspect of the invention provides a business method for managing and/or comparing topologies, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which:

FIG. 1 shows an illustrative environment for comparing topologies according to an embodiment of the invention.

FIGS. 3A-B show an illustrative comparison interface that displays a difference between a pair of topologies according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Figure 2B:
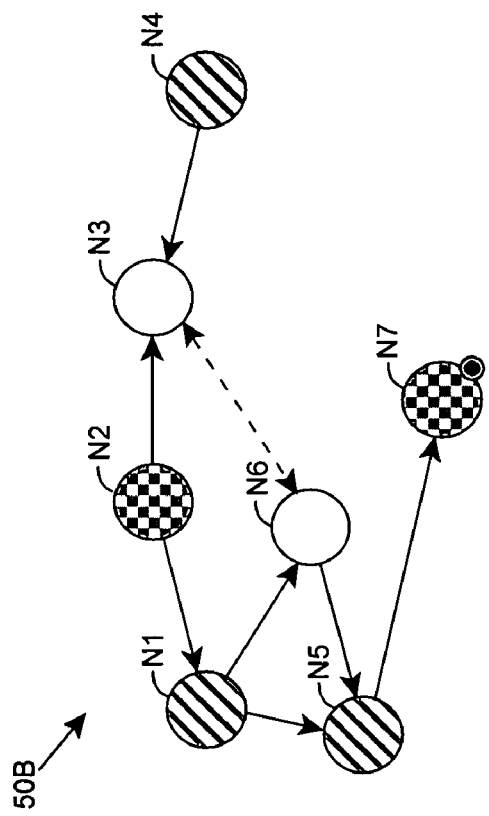
FIGS. 2A-B show a pair of illustrative topologies.

As indicated above, the invention provides a solution for comparing topologies. In an embodiment of the invention, a set of differences between the nodes and/or connectors of two or more topologies is obtained. Each difference can comprise a missing node/connector and/or a difference in an item/relationship attribute. A user interface is generated that displays one or more of the differences by displaying a subset of each topology that corresponds to the difference. In an embodiment of the invention, a user interface for comparing topologies is provided that displays each subset in a unique display area and enables a user to select the difference(s) and/or limit the difference(s) that can be selected based on the type of difference. As used herein, unless otherwise noted, the term "set" means one or more.

Turning to the drawings, FIG. 1 shows an illustrative environment 10 for managing and/or comparing topologies 50 according to an embodiment of the invention. To this extent, environment 10 includes a computer infrastructure 12 that can perform the process described herein in order to compare topologies 50. In particular, computer infrastructure 12 is shown including a computing device 14 that comprises a management system 30, which makes computing device 14 operable to manage and compare topologies 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as management system 30, which is stored in memory 22A and/or storage system 22B. While executing computer program code, processor 20 can read and/or write data, such as topology 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, handheld device, etc.). However, it is understood that computing device 14 and management system 30 are only representative of various possible equivalent computing devices that may perform the process described herein. To this extent, in other embodiments, the functionality provided by computing device 14 and management system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, management system 30 enables computer infrastructure 12 to manage and/or compare topologies 50. To this extent, management system 30 is shown including an interface system 32, a topology system 34, a comparison system 36, and a graphical user interface (GUI) system 38. Operation of each of these systems is discussed further herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, or additional systems and/or functionality may be included as part of computer infrastructure 12.

Regardless, the invention provides a solution for comparing two or more topologies 50. As is known, each topology 50 comprises any type of data/information that can be represented using a set of nodes and/or a set of connectors. To this extent, a typical rendering of topology 50 includes a set of nodes, each of which represents a particular item that is selected based on the particular type of data/information that topology 50 represents. Further, the rendering of topology 50 can include one or more connectors, each of which represents a relationship between two or more nodes. Typically, each node will encapsulate a set of item attributes for the corresponding item, and each connector will encapsulate a set of relationship attributes for the corresponding relationship.

For example, topology 50 can comprise a network topology. In this case, topology 50 can comprise data/information on the network that can be represented using a set of nodes and/or a set of connectors. In particular, each node can represent a computing device in the network, and each connector can represent a communications link (e.g., connection) between two computing devices. To this extent, each node in topology 50 can comprise various item attributes, such as an item type, a label, an operating status, a communication address, and/or the like. Similarly, each connector can comprise various relationship attributes, such as a connection type, an availability status, a direction, and/or the like. Further, item attributes can comprise additional information regarding the corresponding item's connection(s), such as a number of connections. Still further, when comparing two or more topologies 50, an item/relationship attribute can comprise an indication of whether the corresponding node/connector has been matched with another node/connector in each of the other topologies 50. Regardless, it is understood that the network is only illustrative of various types of environments that can be represented using topology 50, such as, for example, a railway system, a home entertainment system, and/or the like.

In any event, management system 30 can manage the set of topologies 50. In particular, interface system 32 can obtain one or more topologies 50 in any known manner. To this extent, interface system 32 can generate a user interface, provide an application program interface (API), and/or the like, which enables a user 16 (human or another system) to add, delete, display, modify, and/or the like, each topology 50. For example, interface system 32 can generate a user interface that, when displayed to user 16, includes user interface control(s) that enable user 16 to define and/or make modifications to the data/information for topology 50. Further, user 16 can comprise another system that communicates with interface system 32 over any type of communications link using, for example, an API, to provide interface system 32 with topology 50, one or more modifications to topology 50, and/or the like. Still further, interface system 32 can read topology 50 from storage system 22B, which stores topology 50 in one or more data objects, such as a file, database record(s), and/or the like.

In order to render topology 50 in a user interface, topology system 34 can analyze the data/information in topology 50 and map it to a set of nodes and/or connectors, which are subsequently rendered in a user interface. To this extent, topology system 34 can comprise a set of rendering rules that define how a particular node/connector is identified in topology 50, and how the node/connector is displayed. Further, the set of rendering rules can define any adornments (e.g., color, shading, arrows, etc.) that can be used to visually represent one or more item/relationship attributes.

Figure 2A:
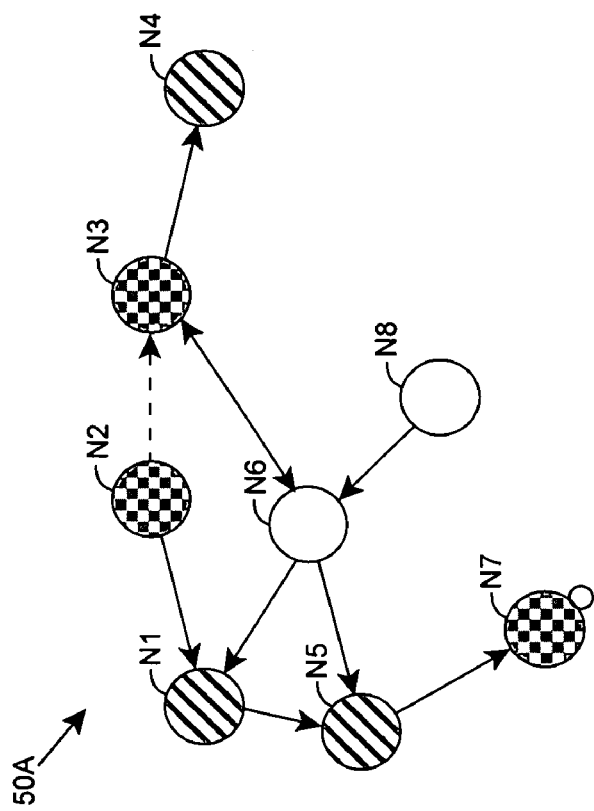

For example, FIGS. 2A-B show a pair of illustrative topologies 5OA-B, respectively. Each topology, such as topology 50A, includes a plurality of nodes N1-8 that are rendered using different shading and/or adornment(s) along with corresponding connectors that are rendered using different line styles and/or arrows. In generating the rendering for topologies 5OA-B, topology system 34 can apply the set of rendering rules to the data/information defined by each topology 5OA-B. To this extent, when topologies 5OA-B comprise a network topology, topology system 34 can use a unique shading for each node that corresponds to a particular type of computing device, a unique adornment to indicate various operating statuses for the computing device, and/or the like. Similarly, topology system 34 can use a unique line style to indicate an availability of a communications link, arrow(s) to indicate a direction for a communications link, and/or the like. It is understood that the various adornments shown and discussed are only illustrative of numerous types of adornments as are known in the art.

Frequently, user 16 desires to compare two or more topologies 50. To this extent, interface system 32 can receive a comparison request to compare two or more topologies, such as topologies 50A-B of FIGS. 2A-B. In response, comparison system 36 can determine a set of differences 52 between topologies 50A-B. Referring to FIGS. 1 and 2A-B, comparison system 36 can match a node, such as node Ni in topology 50A, with a node N1 in topology 50B. Comparison system 36 can implement any known solution for matching nodes N1. To this extent, user 16 could use comparison system 36 to define one or more rules for identifying a match. For example, comparison system 36 can use any combination of one or more of the item attributes for the corresponding items to match two nodes N1. In this case, comparison system 36 can use an order of preference in which the item attribute(s) are used to identify a match. For example, comparison system 36 can first match nodes N1 that have the same item label, next match nodes N1 that have different labels but represent the same item type and have the same relationship attributes, etc.

Comparison system 36 can identify a set of differences 52, if any, between the two matched nodes, such as nodes N1. In particular, comparison system 36 can compare the corresponding sets of item attributes for matched nodes to identify any differences between them. When a difference is identified, comparison system 36 can store data on the difference (e.g., nodes, different item attribute, values) as a difference 52 in the set of differences 52. In addition to identifying differences between two matched nodes, comparison system 36 can identify any node, such as node N8, that is present in one topology 50A but not the other topology 50B. Data on node N8 can also be stored as a difference in the set of differences 52.

Similarly, comparison system 36 can match a connector in topology 50A with a corresponding connector in topology 50B, and identify a set of differences, if any, between the two connectors. In particular, comparison system 36 can compare the corresponding sets of relationship attributes for each connector to determine whether there are any differences. If so, comparison system 36 can store data on the difference (e.g., connector, different relationship attribute, values) as a difference 52 in the set of differences 52. Additionally, comparison system 36 can identify any unmatched connector(s) in topology 50A and/or topology 50B and store data on the unmatched connector as a difference 52 in the set of differences 52.

When comparison system 36 identifies one or more differences 52 between topologies 50A-B, GUI system 38 can generate a user interface, such as comparison interface 54, for displaying the set of differences 52. Otherwise, interface system 32 can generate a message and/or user interface informing user 16 that no differences were found between topologies 50A-B. Comparison interface 54 can display a subset of each topology 5OA-B that corresponds to one or more differences 52 between topologies 50A-B. For example, the set of differences 52 can be stored as a list, and when generating comparison interface 54, GUI system 38 can display the subsets of topologies 50A-B that correspond to the first difference 52 in the list in the user interface. When a displayed difference corresponds to a node/connector present in both topologies 50A-B, the subsets of topologies 50A-B can be selected to display the corresponding node/connector in each topology 50A-B. Alternatively, when the displayed difference corresponds to a missing node/connector in one of the topologies 50A-B, the subsets of topologies 50A-B can be selected to display the node/connector present in the one topology, such as node N8 in topology 50A, and the node(s) in the other topology 50B that correspond to the nodes in topology 50A that are related to the missing node/connector, e.g., node N6 in topology 50B.

In any event, one aspect of the invention provides a user interface for displaying one or more differences between two or more topologies. To this extent, FIGS. 3A-B show an illustrative comparison interface 54 that displays one or more differences between a pair of topologies, such as topologies 50A-B of FIGS. 2A-B, according to an embodiment of the invention. Comparison interface 54 includes a pair of display areas 60A-B, each of which displays a subset of one of topologies 50A-B. The subset of each topology 50A-B displayed in display areas 60A-B corresponds to a selected difference. For example, in FIG. 3A, each display area 60A-B is shown displaying a subset of a corresponding topology 50A-B, respectively, that corresponds to a difference in a direction of a connector between nodes N1 and N6, while in FIG. 3B, each display area 60A-B is shown displaying a subset that corresponds to a missing node N8.

When displaying one or more selected differences, the rendering of one or both subsets of topologies 50A-B (FIGS. 2A-B) can be altered to highlight a node and/or connector that corresponds to the difference(s). For example, as shown in FIG. 3A, the connector between nodes N1 and N6 is highlighted in both display areas 60A-B, while as shown in FIG. 3B, the missing node N8 and its corresponding connector is highlighted in display area 60A. It is understood that highlighting can be implemented using any solution, including altering color, outlining, etc. Further, it is understood that highlighting can be performed by lessening the display characteristics of node(s)/connector(s) that are not related to the difference(s), e.g., "ghosting".

Comparison interface 54 includes various user interface controls that enable user 16 (FIG. 1) to select one or more differences 52 (FIG. 1) for display. In particular, comparison interface 54 includes a user interface control 62 that enables user 16 to select a subset of the set of differences 52, a user interface control 64 that enables user 16 to select a particular difference 52, and a pair of user interface controls 66A-B that enable user 16 to step through differences 52. In general, user 16 can use user interface control 62 to limit the differences 52 that are available for selection using user interface controls 64, 66A-B. The subsets can be defined based on the particular item attribute and/or relationship attribute, including the presence/absence of a matching item/relationship, that corresponds to the difference. Subsequently, user 16 can use user interface control 64 to select a particular difference 52 for display and/or use user interface controls 66A-B to step through the differences 52.

As shown in FIG. 3B, user interface control 62 can enable the selection of any difference 52, a subset of item-related differences, or a subset of connection-related differences. Further, the item-related differences and/or connection-related differences can be further divided into one or more subsets of differences 52, such as a different item label, item type, item status, a missing item, and the like, for the item-related differences. When no differences 52 correspond to a particular item/relationship attribute, user interface control 62 can disable an ability of user 16 to select the corresponding subset (e.g., grey out the option, not include the option, and/or the like).

It is understood that user interface controls 62, 64, 66A-B are only illustrative of numerous types of user interface controls that could be implemented to provide similar functionality. Further, it is understood that user interface control 62 can enable the selection of multiple subsets of the set of differences and/or user interface controls 64, 66A-B can enable the selection of multiple differences 52. In the latter case, the subsets of topologies 50A-B (FIGS. 2A-B) displayed in display areas 60A-B can be selected to include the nodes/connectors that correspond to all the selected differences 52. Still further, it is understood that comparison interface 54 can include various additional user interface controls that enable user 16 to perform various additional operations, such as selecting a level of zoom (e.g., increase/decrease node/connector size) for topologies 50A-B, scrolling (e.g., moving displayed portion of topology up/down, left/right) the displayed subset of topologies 50A-B, and/or the like.

Returning to FIG. 1, after GUI system 38 generates comparison interface 54, interface system 32 can provide comparison interface 54 for display to user 16. For example, interface system 32 can render comparison interface 54 on a display device, communicate comparison interface 54 for rendering on another system (e.g., over a network such as the Internet), and/or the like. Subsequently, user 16 can use one or more of the user interface controls in comparison interface 54 to select one or more differences 52 for display. Interface system 32 can receive the selected difference(s) 52, and GUI system 38 can update comparison interface 54 to display the selected difference(s) 52, which interface system 32 can provide for display to user 16. In particular, GUI system 38 can update display areas 60A-B (FIG. 3A) to display subsets of the corresponding topologies 50 for the selected difference(s) 52. To this extent, it is understood that, when updating a display of comparison interface 54, interface system 32 can provide a new version of comparison interface 54 and/or partial display data for comparison interface 54, such as display areas 60A-B.

Figure 4:
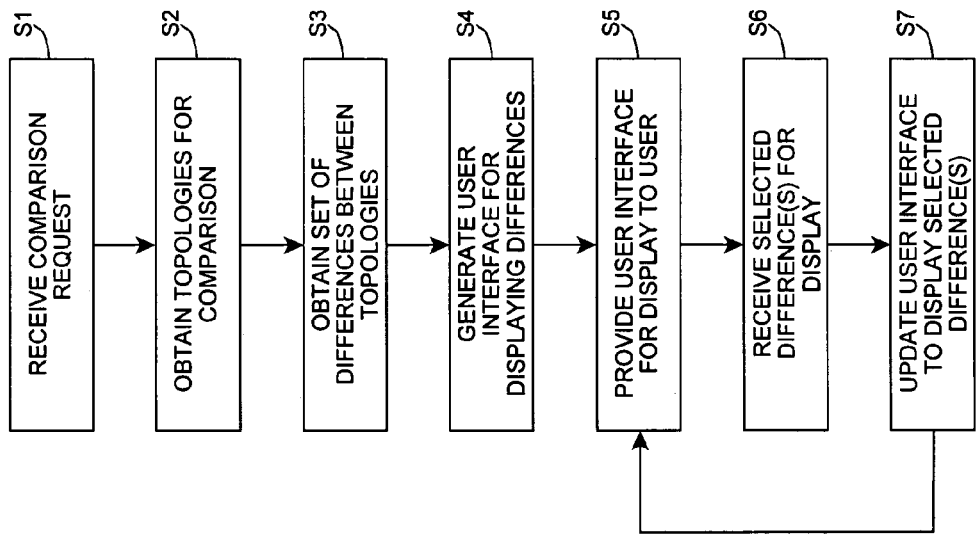
FIG. 4 shows an illustrative process for comparing topologies according to an embodiment of the invention.

One aspect of the invention provides a method of comparing two or more topologies 50. To this extent, FIG. 4 shows an illustrative process that can be implemented by, for example, computer infrastructure 12 of FIG. 1, in order to compare topologies 50 according to an embodiment of the invention. Referring to FIGS. 1 and 4, in step S1, interface system 32 receives a comparison request from user 16. In step S2, interface system 32 obtains the topologies 50 to be compared. In step S3, comparison system 36 obtains a set of differences 52 between topologies 50. In step S4, GUI system 38 generates a user interface, such as comparison interface 54, for displaying one or more of the set of differences 52. In step S5, interface system 32 provides comparison interface 54 for display to user 16. In step S6, interface system 32 receives one or more selected differences 52 for display in comparison interface 54. In step S7, GUI system 38 updates comparison interface 54 to display the selected difference(s) 52. Subsequently, flow returns to step S5. The process can continue until user 16 selects to close comparison interface 54. It is understood that the steps and the corresponding order shown in FIG. 4 are only illustrative. To this extent, two or more steps can be performed simultaneously, the order can be altered, one or more additional steps can be performed, and/or one or more steps can be removed without departing from the invention described herein. To this extent, the claimed invention is not limited by the particular configuration of steps shown and described herein.

While shown and described herein as a method and system for managing and/or comparing topologies 50 (FIG. 1), it is understood that the invention further provides various alternative embodiments. For example, in one embodiment, the invention provides a program product stored on a computer-readable medium, which when executed, enables a computer infrastructure to manage and/or compare topologies 50. To this extent, the computer-readable medium includes program code, such as management system 30 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program product).

In another embodiment, the invention provides a method of generating a system for managing and/or comparing topologies 50 (FIG. 1). In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider (ASP), could offer to manage and/or compare topologies 50 (FIG. 1) as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement, the service provider can receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method, executed by a computer device, of comparing topologies, the method comprising:

obtaining a first topology and a second topology, each topology including a set of nodes, each node representing an item having a set of item attributes;

obtaining a set of differences between the first topology and the second topology based on the set of item attributes;

obtaining a selection of a user-defined subset of the set of differences, the set of differences being between the first topology and the second topology at a particular point in time; and generating a user interface that graphically displays at least one of the user-defined subset of the set of differences, the user interface graphically displaying a first subset of the first topology and a second subset of the second topology, the first and second subsets corresponding to the at least one of the user-defined subset of the set of differences, wherein said user interface comprises graphical controls including at least one of a zoom control and a scrolling control.

2. The method of claim 1, further comprising receiving a comparison request for the first topology and the second topology, the generating being performed in response to the comparison request.

3. The method of claim 1, further comprising providing the user interface for display to a user.

4. The method of claim 1, further comprising:

receiving a selection of a second user-defined subset of the set of differences; and updating the user interface to display at least one of the second user-defined subset of the set of differences.

5. The method of claim 1, the obtaining the set of differences including:

matching a first node in the first topology with a second node in the second topology based on the corresponding items; and identifying a difference between the first node and the second node based on at least one of the corresponding sets of item attributes.

6. The method of claim 1, each topology further including a set of connectors, each connector representing a relationship having a set of relationship attributes, the obtaining the set of differences being further based on the set of relationship attributes.

7. The method of claim 6, the obtaining the set of differences including:

matching a first connector in the first topology with a second connector in the second topology based on the corresponding relationships; and identifying a difference between the first connector and the second connector based on at least one of the corresponding sets of relationship attributes.

8. The method of claim 6, the user interface including:

a first display area for displaying a graphical representation of the first subset of the first topology; and a second display area, unique from the first display area, for displaying a graphical representation of the second subset of the second topology, at least one of the first and second subsets highlighting at least one of a node or a connector that corresponds to the at least one of the set of differences.

9. A system for comparing topologies, the system comprising:

a sub-system for obtaining a first topology and second topology, each topology including:

a set of nodes, each node representing an item having a set of item attributes; and a set of connectors, each connector representing a relationship having a set of relationship attributes;

a sub-system for obtaining a set of differences between the first topology and the second topology based on at least one of: the set of item attributes or the set of relationship attributes;

a sub-system for obtaining a selection of a user-defined subset of the set of differences, the set of differences being between the first topology and the second topology at a particular point in time; and a sub-system for generating a user interface that graphically displays at least one of the user-defined subset of the set of differences, the user interface graphically displaying a first subset of the first topology and a second subset of the second topology, the first and second subsets corresponding to the at least one of the user-defined subset of the set of differences, wherein said user interface comprises graphical controls including at least one of a zoom control and a scrolling control.

10. The system of claim 9, further comprising a sub-system for receiving a comparison request for the first topology and the second topology.

11. The system of claim 9, further comprising a sub-system for providing the user interface for display to a user.

12. The system of claim 9, further comprising:
a sub-system for receiving a selection of a second user-defined subset of the set of differences; and
a sub-system for updating the user interface to display at least one of the second user defined subset of the set of differences.

13. The system of claim 9, the user interface including a user interface control that enables a user to select the at least one of the user-defined subset of the set of differences.

14. The system of claim 9, the user interface including:
a first display area for displaying a graphical representation of the first subset of the first topology; and
a second display area, unique from the first display area, for displaying a graphical representation of the second subset of the second topology, at least one of the first and second subsets highlighting at least one of a node or a connector that corresponds to the at least one of the user-defined subset of the set of differences.

15. The system of claim 9, the user interface including a user interface control that enables a user to select the user-defined subset of the set of differences for selection based on one of the set of item attributes or the set of relationship attributes that corresponds to the difference.

16. A computer program product which when executed by a processor, enables a computer infrastructure to compare topologies, the program product comprising a computer readable storage medium having computer readable program code embodied therewith, the computer readable program code comprising:

Computer readable program code configured to obtain a first topology and a second topology, each topology including:
a set of nodes, each node representing an item having a set of item attributes; and
a set of connectors, each connector representing a relationship having a set of relationship attributes;

Computer readable program code configured to obtain a set of differences between the first topology and the second topology based on at least one of: the set of item attributes or the set of relationship attributes;

Computer readable program code configured to obtain a selection of a user-defined subset of the set of differences, the set of differences being between the first topology and the second at a particular point in time; and Computer readable program code configured to generate a user interface that graphically displays at least one of the user-defined subset of the set of differences, the user interface graphically displaying a first subset of the first topology and a second subset of the second topology, the first and second subsets corresponding to the at least one of the user-defined subset of the set of differences, wherein said user interface comprises graphical controls including at least one of a zoom control and a scrolling control.

17. The program product of claim 16, the user interface including:
a first display area for displaying a graphical representation of the first subset of the first topology; and
a second display area, unique from the first display area, for displaying a graphical representation of the second subset of the second topology, at least one of the first and second subsets highlighting at least one of a node or a connector that corresponds to the at least one of the set of differences.

18. The program product of claim 16, the user interface including a user interface control that enables a user to select the at least one of the user-defined subset of the set of differences.

19. The program product of claim 16, the user interface including a user interface control that enables a user to select the user-defined subset of the set of differences for selection based on at least one of: the set of item attributes or the set of relationship attributes that corresponds to the difference.

* * * * *